US009411551B2

(12) United States Patent
Haren

(10) Patent No.: US 9,411,551 B2
(45) Date of Patent: Aug. 9, 2016

(54) DOCKING STATION HAVING MULTIPLE MODES

(75) Inventor: Edgar Haren, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 2072 days.

(21) Appl. No.: 12/571,918

(22) Filed: Oct. 1, 2009

(65) Prior Publication Data

US 2011/0080342 A1   Apr. 7, 2011

(51) Int. Cl.
*G06F 3/00* (2006.01)
*G06F 3/14* (2006.01)
*G06F 3/038* (2013.01)
*G09G 5/08* (2006.01)
*G09G 5/12* (2006.01)

(52) U.S. Cl.
CPC .............. *G06F 3/1438* (2013.01); *G06F 3/038* (2013.01); *G06F 3/1431* (2013.01); *G06F 3/1446* (2013.01); *G09G 5/08* (2013.01); *G09G 5/12* (2013.01); *G09G 2300/026* (2013.01); *G09G 2360/04* (2013.01); *G09G 2370/24* (2013.01)

(58) Field of Classification Search
CPC ............................ G09G 2370/24; G06F 3/023
USPC .......................................................... 710/14
See application file for complete search history.

(56) References Cited

U.S. PATENT DOCUMENTS

| 5,986,622 | A | * | 11/1999 | Ong ................................ 345/1.1 |
| 6,609,034 | B1 | | 8/2003 | Behrens et al. |
| 6,915,362 | B2 | * | 7/2005 | Ramsey et al. ................. 710/62 |
| 7,545,361 | B2 | * | 6/2009 | Erickson ....................... 345/156 |
| 2004/0015980 | A1 | * | 1/2004 | Rowen et al. ................. 719/310 |
| 2005/0060467 | A1 | | 3/2005 | Wieck |
| 2005/0246470 | A1 | | 11/2005 | Brenner |
| 2006/0020732 | A1 | | 1/2006 | Charna |
| 2006/0184705 | A1 | | 8/2006 | Nakajima |
| 2006/0248252 | A1 | * | 11/2006 | Kharwa ......................... 710/303 |
| 2008/0040527 | A1 | | 2/2008 | Filipov et al. |
| 2008/0048975 | A1 | * | 2/2008 | Leibow ......................... 345/156 |
| 2008/0195788 | A1 | | 8/2008 | Tamir et al. |
| 2009/0172422 | A1 | | 7/2009 | Campesi et al. |
| 2010/0180055 | A1 | * | 7/2010 | Lyon et al. ...................... 710/62 |

* cited by examiner

Primary Examiner — Titus Wong
(74) Attorney, Agent, or Firm — HP Inc. Patent Department

(57) ABSTRACT

An exemplary docking station includes a first computer port, a second computer port, and a controller. The first computer port is provided to receive a first video signal. The second video port is provided to receive a second video signal. The controller is provided to selectively drive displays of a first monitor and a second monitor according the first and second video signals. In particular, the controller configured to selectively operate in one of a first mode, a second mode, and a third mode. In the first mode, the controller drives the display of the first monitor according to the first video signal and drives the display of the second monitor according to the second video signal. In the second mode, the controller drives the displays of the first and second monitors according to the first video signal. In the third mode, the controller drives the displays of the first and second monitors according to the second video signal.

9 Claims, 7 Drawing Sheets

DOCKING STATION HAVING MULTIPLE MODES

BACKGROUND

Engineers, graphic designers, and others often utilize two computers to perform various daily tasks. For example, one computer may be used for processor intensive applications and another may be used for e-mail, word processing, and the like. Such users are also likely to utilize two monitors. To share the monitors, keyboard, and mouse, a user may employ a KVM switch that selectively couples one or the other computer to the devices as desired by the user. Unfortunately, such switches do not allow the two computers to share other peripheral devices such as printers and external memory. Moreover, those switches only allow one computer to drive the displays of the monitors at a given time.

DRAWINGS

DETAILED DESCRIPTION

Various applications such as those used by graphics designers and engineers consume significant computer resources. As a consequence, many users employ two computers to perform daily tasks. A higher performance computer is dedicated to graphics intensive applications while another remains available for e-mail and word processing functions. In other situations a user may have a desktop computer for office use a laptop or netbook for travel. In either scenario, the user may find it desirable to share devices such as monitors, a mouse, a keyboard, and other various peripherals between the two computers.

A docking station described below allows two computers to share dual monitors and any number of peripheral devices including a mouse, keyboard, printers, and external memory. The docking station can be caused to operate in a number of modes. In a first mode, video signals from one computer are used to drive the display of one monitor while video signals from the other computer are used to drive the display of the other monitor. Either computer can be selectively identified as being active. Signals from the peripheral devices coupled to the docking station are then routed to the active computer. In the second mode, video signals from one computer are used to drive the displays of both monitors with signals from the peripheral devices being routed to that same computer. In the third mode, video signals from the other computer are used to drive the displays of both monitors with the signals from the peripheral devices being routed to that other computer.

The following description is broken into sections. The first, labeled "Environment," describes exemplary environments in which embodiments may be implemented. The second section, labeled "Components" describes various physical and logical components utilized to implement various embodiments. The third section, labeled as "Operation", describes steps taken to implement various embodiments. The last section, labeled "Example," describes examples of the various operational modes of a docking station.

Figure 1:
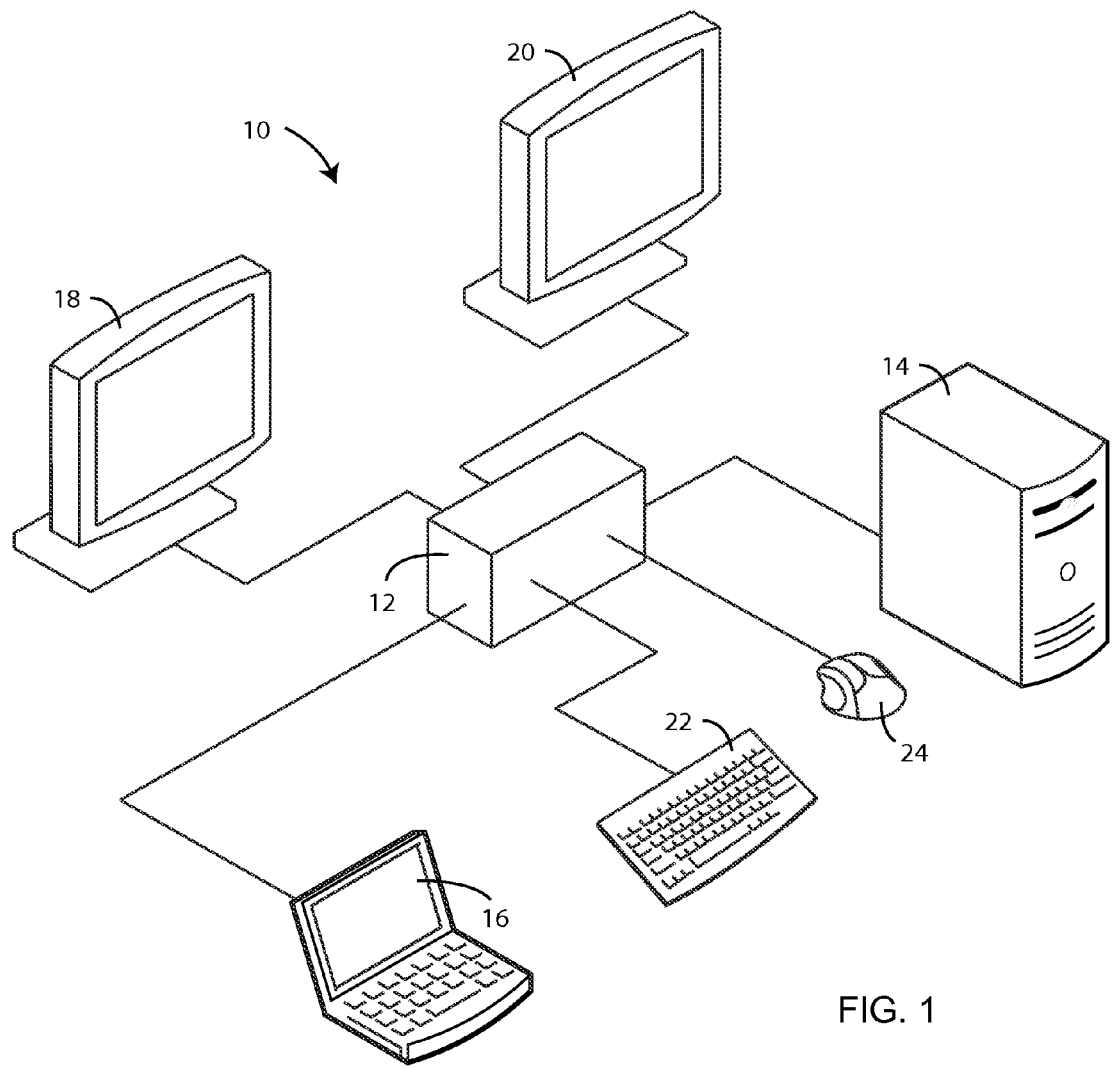
FIG. 1 depicts an exemplary environment in which embodiments may be implemented.

ENVIRONMENT: FIG. 1 depicts exemplary environment 10 in which embodiments may be implemented. Environment 10 includes docking station 12, computers 14 and 16, monitors 18 and 20, keyboard 22, and mouse 24. Docking station 12, discussed in more detail below, represents an apparatus that allows computers 12 and 14 to share monitors 18 and 20 and peripheral devices 22 and 24. In particular, docking station 12 is configured to operate in a number of modes. In a first mode, video signals from computer 14 are used to drive the display of monitor 20, while video signals from computer 16 are used to drive the display of monitor 18. Docking station 12 can selectively identify either computer 14 or 16 as being active. Signals from peripheral devices 22 and 24 coupled to docking station 12 are then routed to the active computer 14 or 16. In the second mode, video signals from computer 14 are used to drive the displays of both monitors 18 and 20 with signals from peripheral devices 22 and 24 being routed to computer 14. In the third mode, video signals from computer 16 are used to drive the displays of monitors 18 and 20 with the signals from peripheral devices 22 and 24 being routed to computer 16.

Docking station 24 includes ports for coupling to devices 14-24. Each such port may provide a wired or a wireless connection. While FIG. 1 shown only peripheral device 22 and 24 coupled to docking station 12, docking station 12 may include any number of additional wired and wireless ports for coupling to additional devices such as printers and external memory devices. Furthermore, docking station 12 may be configured to drive the displays of more than two monitors and to allow more than two computers to share such devices 14-24.

Figure 2:
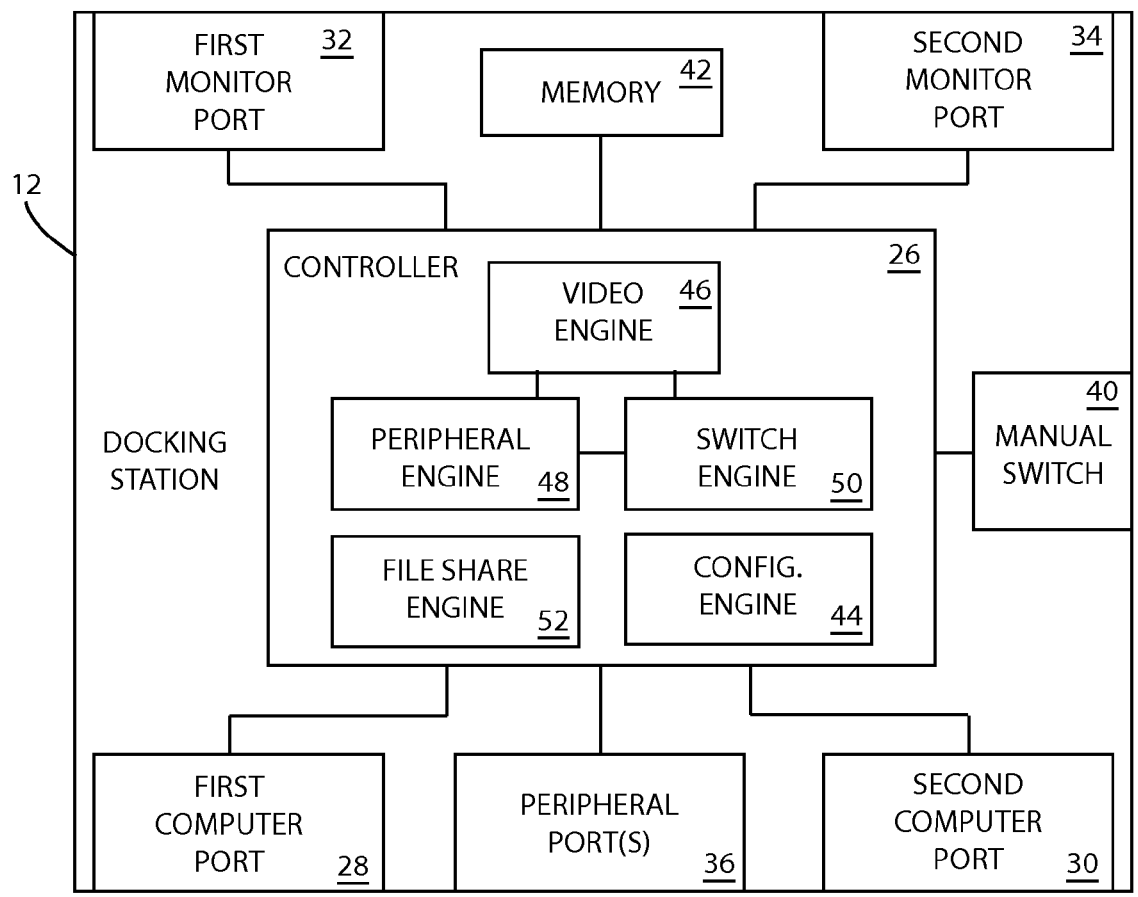
FIG. 2 depicts an exemplary docking station according to an embodiment.

COMPONENTS: FIG. 2 is a block diagram depicting an example of the various physical and logical components of docking station 12. In the example of FIG. 2, docking station 12 is shown to include controller 26, first and second computer ports 28 and 30, first and second monitor ports 32 and 34, peripheral port 36, memory 38 and manual switch 40. Computer ports 28 and 30 each represent a physical wired or wireless port through which communication signals can be routed between controller 26 and a connected computer. In one example, computer ports 28 and 30 are USB (Universal Serial Bus) ports capable of receiving compressed video signals along with other data from connected computers. Monitor ports 32 and 34 each represent a physical wired or wireless port though which controller 26 can drive the display of a connected monitor. Examples include VGA (Video Graphics Array), DVI (Digital Video Interface), and HDMI (High Definition Multimedia Interface) ports. Peripheral port(s) 36 represent one or more physical wired or wireless ports through which controller 26 may be coupled to one or more peripheral devices. Such peripheral devices can include mice, keyboards, printers, external memory among many others. Peripheral port(s) 36 can include USB ports, PS/2 (Personal System/2) ports, card slots, parallel ports, among many others.

Memory 38 represents generally any memory device or combination of memory devices capable of storing program instructions that can be communicated to computers coupled to computer ports 28 and 30. Such program instructions can include drivers that when installed allow a computer to interact with docking station 12. Other program instructions, when installed allow file sharing between computers coupled to docking station 12. Manual switch 40 represents generally a physical switch or control configured to be manipulated by a user. Manipulation of manual switch 40 causes controller 26 to operate in a selected mode.

Controller 26 represents generally a combination of hardware and programming configured to control the operation of docking station 12. In the example of FIG. 2, controller 26 is shown to include configuration engine 44, video engine 46, peripheral engine 48, switch engine 50, and file share engine 52. Configuration engine 44 is responsible for detecting when a computer couples to docking station 12 via one of first computer port 28 and second computer port 30. Upon coupling, the computer and configuration engine 44 communicates negotiation signals to confirm the communication capabilities of the computer. Using the negotiation data, configuration engine 44 determines whether or not the newly coupled computer has access to program instructions, such as a driver, that enables the computer to utilize docking station 12. Upon a positive determination, configuration engine 44 places docking station in an operational mode with respect to that computer.

Upon a negative determination, configuration engine 44 places docking station 12 in a set up mode with respect to that computer. In set-up mode, docking station 12 may appear as a mass storage device providing the computer access to memory 42. The program instructions contained in memory 42 may include an "auto-run" program that causes the computer to automatically install program instructions for utilizing docking station 12. As noted, those program instructions may include a device driver and a file sharing application. In another implementation, the user of the computer may browse the contents of memory 42 to select and install the desired program instructions.

Video engine 46 is responsible for driving the displays of monitors coupled to monitor ports 32 and 34 according to video signals received via video signals received via computer ports 28 and 30. The video signals, for example, may be compressed signals received via a USB connection. Here, video engine 46 would decompress the video signals received via a given computer port 28 or 30 and route the decompressed signals via one or both monitor ports 32 and 34 depending upon a current operational mode of docking station 12.

As previously noted, in a first operational mode, video engine 46 drives the display of a monitor coupled to first monitor port 32 according to video signals received via first computer port 28 and drives a monitor coupled to monitor port 34 according to video signals received via second computer port 30. In a second operational mode, video engine 46 drives the displays of the monitors coupled to the first and second video ports 32 and 34 according to the video signals received via first computer port 28. In a third operational mode, video engine 46 drives the displays of the monitors coupled to monitor ports 32 and 34 according to video signals received via second computer port 30.

Peripheral engine 48 is responsible for routing peripheral signals between peripheral ports port(s) 36 and one of computer ports 28 and 30 selected based upon a current operational mode of docking station 12. Peripheral signals are communications originating from or directed to peripheral devices coupled to peripheral port(s) 36. Such peripheral signals may include input device signals generated by a keyboard and a mouse. Other peripheral signals can include write or read instructions directed to an external memory device. Yet other peripheral signals can communicate print jobs.

When in the first operational mode, noted above, peripheral engine 48 routes peripheral signals between peripheral port(s) and an active one of first computer port 28 and second computer port 30. As discussed below, switch engine 50 is responsible for setting a given computer port 28 or 30 as active. The term active is used only to indicate that peripheral signals are routed via a given computer port. In other words, a computer port 28 or 30 that is not set as active may still be used for other purposes. When in the second operational mode, peripheral engine 48 routes peripheral signals between peripheral port(s) 36 and first computer port 28. When in the third operational mode, peripheral engine 48 routes peripheral signals between peripheral port(s) 36 and second computer port 30.

Switch engine 50 is responsible for setting the operational mode of docking station 12. Further, when in the first operational mode, switch engine 50 is also responsible for setting one of first computer port 28 and second computer port 30 as active. Switch engine 50 may perform its responsibilities in response to signals received from manual switch 40, from peripheral port(s) 36, and from computer ports 28 and 30. In particular, a user may manipulate manual switch 40 causing signals to be communicated to switch engine 50 resulting in switch engine 50 changing operational modes. Signals received from a mouse or a keyboard coupled to a peripheral port 36 may also cause an operational mode change. Further, a signal from a computer received via computer port 28 or 30 may also cause an operational mode change.

In an exemplary implementation, switch engine 50 may monitor computer ports 28 and 30 for an activation signal. An activation signal is a signal that indicates that a given computer port 28 or 30 is to be set as active. For example, when operating in the first mode with first computer port 28 set as active, peripheral signals from a mouse and keyboard are routed from peripheral port(s) 36 to a first computer via first computer port 28. A driver executing on the first computer analyzes and acts on the peripheral signals. Typically, this involves recognizing keystrokes and mouse movements and taking expected actions. However, the driver may recognize certain mouse movements and/or keystrokes as an indication that second computer port 30 is to be set as active. Upon such recognition, the driver communicates an activation signal via computer port 28. Switch engine 50 receives the activation signal and, in response, sets second computer port 30 as active resulting in peripheral signals being routed between peripheral port(s) 36 and second computer port 30.

In another implementation, switch engine 50 may monitor peripheral port(s) 36 for an activation signal. For example, switch engine 50 may recognize a particular key stroke or strokes from a keyboard or a particular mouse movement or button selection as an activation signal. In response, switch engine 50 sets second computer port 30 as active resulting in peripheral signals being routed between peripheral port(s) 36 and second computer port 30.

File sharing engine 52 is responsible for routing file sharing data via the first and second computer ports 28 and 30. File sharing data is data used by computers coupled to first and second computer ports 28 and 30 to synchronize data repositories. Such repositories can include file folders, electronic mail, contact information, and the like. Thus, file sharing engine 52 routes file sharing data received via one computer port 28 or 30 via the other computer port 30 or 28.

Figure 3:
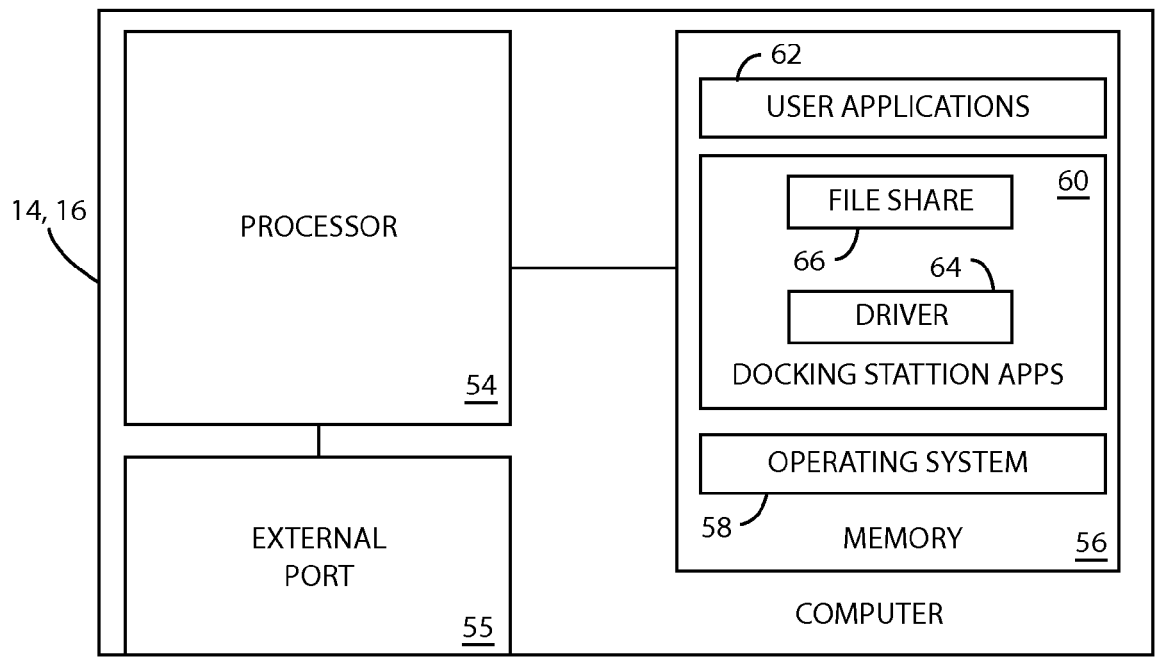
FIG. 3 depicts an exemplary implementation of a computer configured to utilize the docking station of FIG. 2 according to an embodiment.

FIG. 3 is a block diagram depicting an example of the various physical and logical components of a computer 14 or 16 (see FIG. 1) configured to utilize docking station 12 of FIG. 2. In the example of FIG. 3, computer 14, 16 includes processor 54, external port 55, and memory 56. Processor 54 represents generally any processor capable of executing program instructions stored in memory 56. Execution of those program instructions can cause processor 54 to send and receive signals via external port 55. External port 55 represents generally any physical wired or wireless port through which signals can be communicated to and from computer 14, 16. For example, external port 55 may be a wired USB or Firewire® port or a wireless interface capable of communicating using protocols such as 802.11 or Bluetooth®.

Memory 56 represents generally one or more memory devices capable of storing program instructions that can be accessed by processor 54. In the example of FIG. 3, memory 56 is shown to include operating system 58, docking station applications 60, and user applications 62. Operating system 58 represents generally any software platform on top of which other programs or applications such as applications 60 and 62 run. Examples include Linux® and Microsoft Windows®. Docking station applications 60 represent generally programs configured to enable computer 14, 16 to utilize docking station 12 (FIG. 2). User applications 62 represent generally any other programs available to a user of computer 14, 16. Examples may include word processors, web browsers, games, and image editing applications.

Docking station applications 60 are shown to include driver 64 and file share 66. Driver 64 represents generally program instruction, that when executed be processor 54, serves as a translator between computer 14, 16 and a docking station coupled via external port 55. In particular, driver 64 is responsible for receiving signals, such as peripheral device signals, from the docking station via external port 55 and translating, if needed, those signals into a format compatible with operating system 58, file share 66, and user applications 62. Received peripheral device signals can include input device signals supplied by the docking station via external port 55. As noted above such input device signals can include signals from a keyboard and a pointing device such as a mouse coupled to the peripheral ports of the docking stations.

Driver 64 is also responsible for translating, if needed, instructions from operating system 58, file share 66 and user applications 62 into signals compatible with the docking station. Driver 64 communicates the video signals and peripheral device signals via external port 55 to the docking station. Communicated peripheral device signals can include read/write commands intended for an external memory device and print jobs intended for a printer. Communicated video signals are for use by the docking station in driving the display of one or more monitors. Diver 64 provides the video signals such that the resulting display driven by the docking station is reflective, at least in part, of the input device signals received by driver 64 from the docking station. For example, input device signals may include key strokes directed to a user application 62 such as a word processor. The provided video signals then are reflective of the keystrokes in that the driven display includes text reflective of the keystrokes. In another example, input device signals can include signals from a mouse intended to select an icon. The provided video signals then are reflective of the mouse signals in that the driven display includes mouse cursor motion and some action indicative of the icon's selection such as the opening of a file or program.

Driver 64 is responsible for examining received input device signals to determine if those signals indicative of a deactivation instruction. A deactivation instruction is an instruction indicating that a computer port of the docking station coupled to external port 55 is to be deactivated and another computer port of the docking station is to be activated for a different computer. Upon a positive determination, driver 66 communicates a deactivation signal via external port 55 to the docking station. Following communication of the deactivation signal, video signals communicated via external port 55 may still cause the docking station to drive a display of a monitor. However, that display is no longer reflective of input device signals received from the docking station.

Input device signals indicative of a deactivation instruction may originate from a pointing device such as a mouse that cause a motion of a cursor to or passed a particular coordinate or set of coordinates. An exemplary set of coordinates include an edge of a display. Thus, signals from a mouse indicating motion of a mouse cursor beyond one side of the screen may be interpreted by driver 64 as being indicative of a deactivation instruction. In another example, signals indicative of a deactivation instruction may be input device signals originating form a keyboard or pointing device that indicate a particular button or sequence of buttons have been pressed by a user. File share 66 represents program instructions that when executed by processor 54 communicates and receives file share data via external port 55. As noted, file share data is data used by computer 14, 16 to synchronize data repositories. Such repositories can include file folders, electronic mail, contact information, and the like. Thus, file share 66 is responsible for updating a local file share repository (not shown) using file share data received via external port. File share 66 is also responsible for detecting unreported changes to the local file share repository and communicating file share data representative of the change via external port 55 allowing the docking station to route the file share data to another computer.

Figure 4:
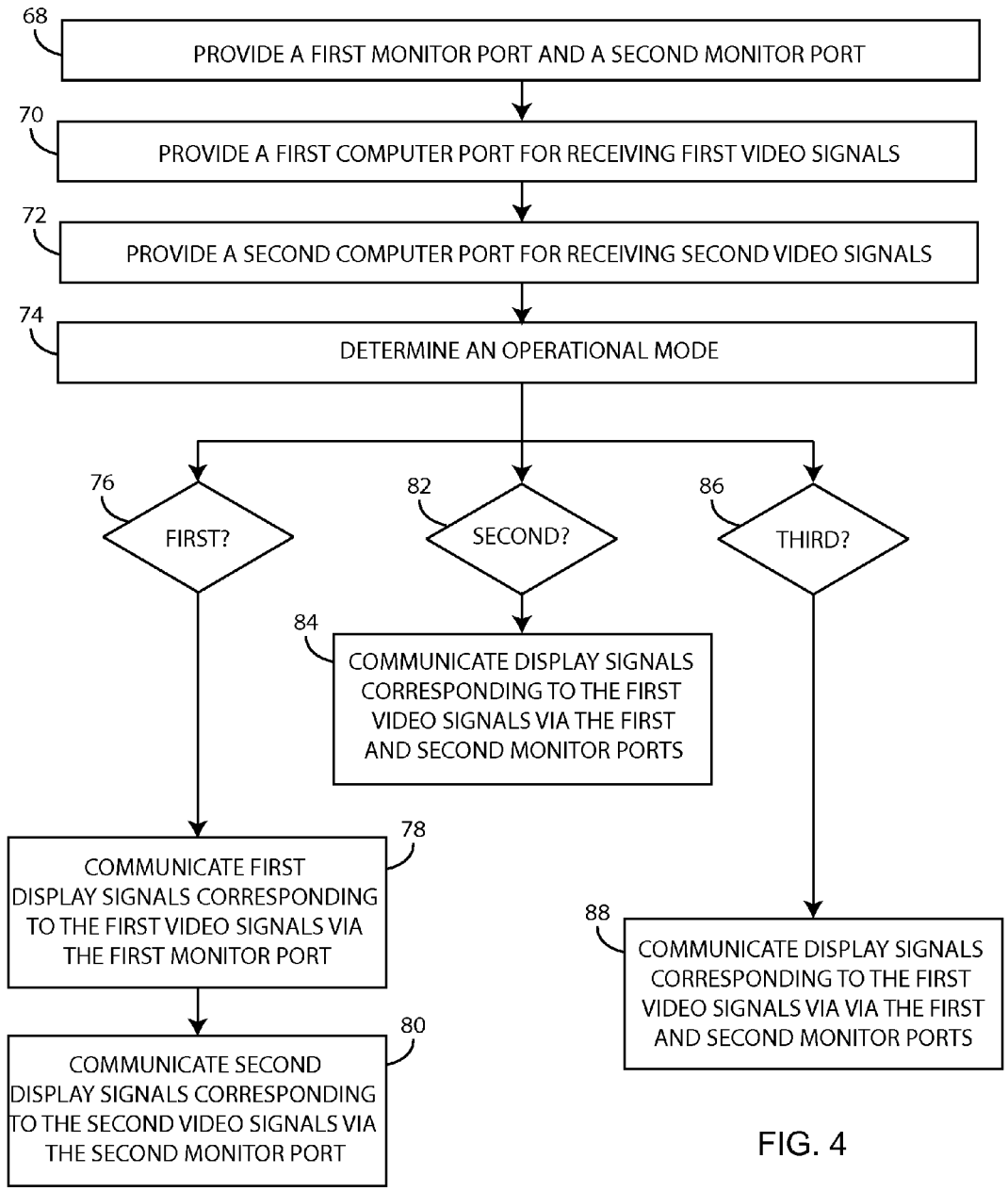
FIGS. 4-6 are flow diagram depicting steps take to implement various embodiments.
Figure 5:
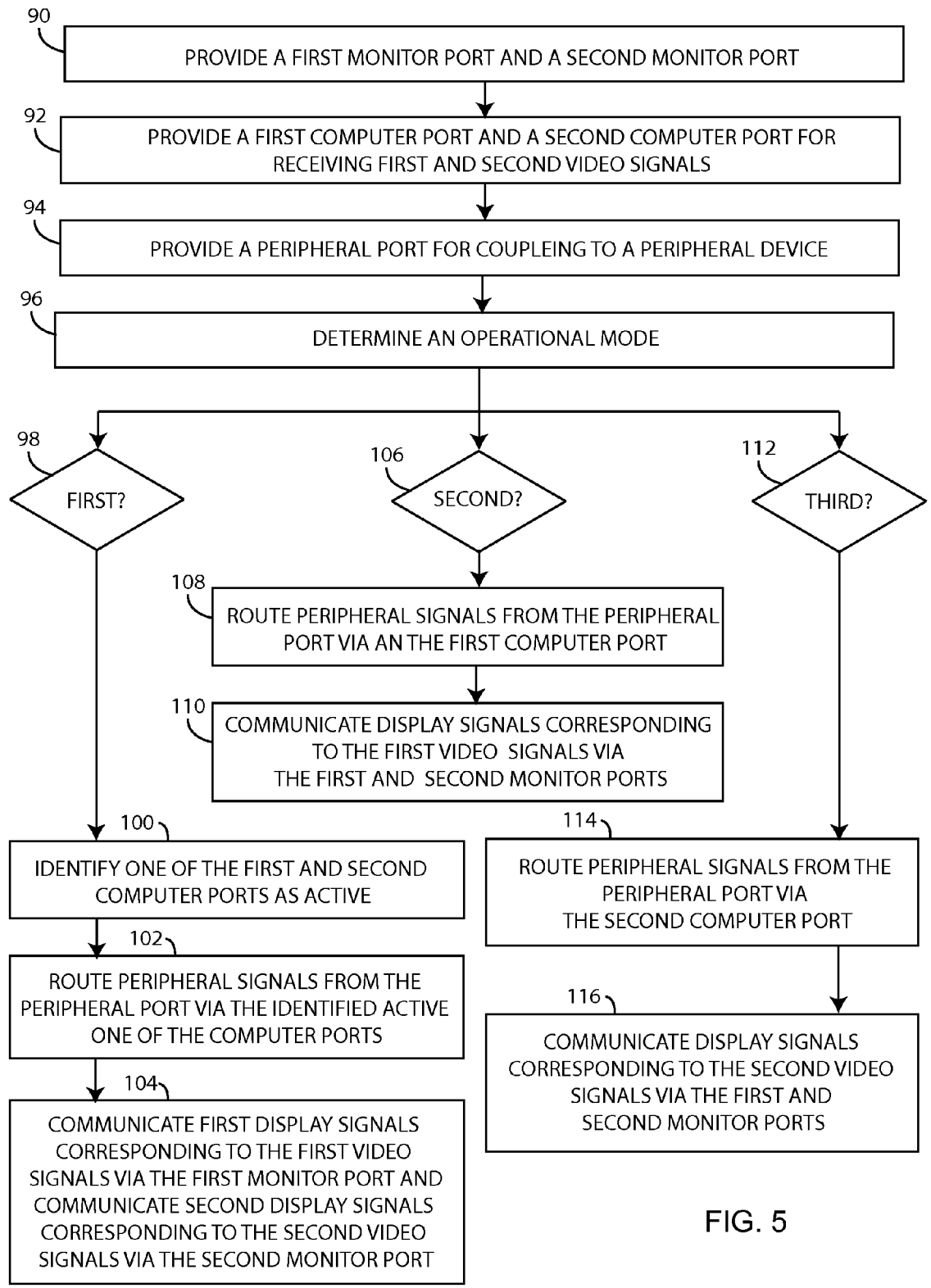
Figure 6:
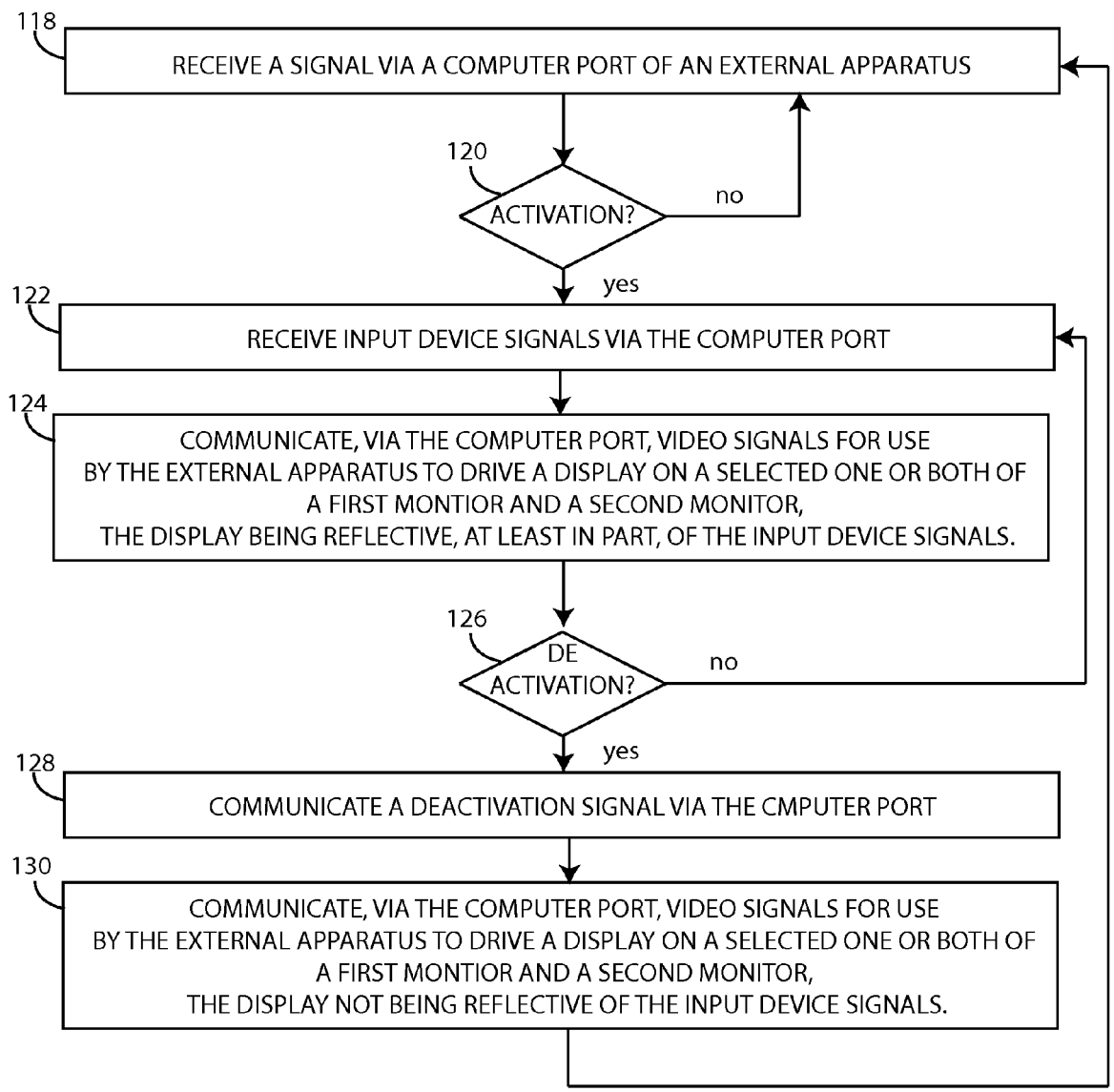

OPERATION: FIGS. 4-6 are exemplary flow diagrams of steps taken to implement various embodiments. In discussing FIGS. 5-8, reference may be made to the diagrams of FIGS. 1-3 to provide contextual examples. Implementation, however, is not limited to those examples.

Starting with FIG. 4, first and second monitor ports are provided in an apparatus (step 68). Referring to FIG. 2, first monitor port 32 and second monitor port 34 are provided in docking station 12. A first computer port is provided for receiving a first video signal (step 70) and a second computer port is provided for receiving a second video signal (step 72). Again referring to FIG. 2, first computer port 28 and second computer port 30 are provided in docking station 12.

An operational mode is determined (step 74). The operational mode is one of a first mode, second mode, and third mode. Referring to FIG. 2, controller 26 is responsible for determining the operational mode of docking station 12. In particular, switch engine 50 determines and sets the operational mode based upon signals received via one or more of manual switch 40, peripheral port(s) 36 and computer ports 28 and 30. In response to a first mode determination (step 76), display signals corresponding to the first video signals are communicated via the first monitor port and display signals corresponding to the second video signals are communicated via the second monitor port (steps 78 and 80). In response to a second mode determination (step 82), display signals corresponding to the first video signal are communicated via the first and second monitor ports (step 84). In response to a third mode determination (step 86), display signals corresponding to the second video signals are communicated via the first and second monitor ports (step 88). Referring again to FIG. 2, controller 26 is responsible for implementing steps 78, 80, 84, and 88.

Moving to FIG. 5, first and second monitor ports are provided in an apparatus (step 90). Referring to FIG. 2, first monitor port 32 and second monitor port 34 are provided in docking station 12. A first computer port is provided for receiving a first video signal, and a second computer port is provided for receiving a second video signal (step 92). Again referring to FIG. 2, first computer port 28 and second computer port 30 are provided in docking station 12. A peripheral port is provided in the apparatus (step 96). Referring to FIG. 2, peripheral port(s) 36 are provided in docking station 12.

An operational mode is determined (step 96). The operational mode is one of a first mode, second mode, and third mode. Referring to FIG. 2, controller 26 is responsible for determining the operational mode of docking station 12. In particular, switch engine 50 determines and sets the operational mode based upon signals received via one or more of manual switch 40, peripheral port(s) 36 and computer ports 28 and 30. In response to a first mode determination (step 76):
  one of the first computer port and the second computer port is identified as active (step 100);
  peripheral signals received via the peripheral port are routed via the active one of the first and second computer ports (step 102);
  display signals corresponding to the first video signals are communicated via the first monitor port and display signals corresponding to the second video signals are communicated via the second monitor port (step 104).
Additionally, in response to a first mode determination (step 98), the second computer port may be set as active and the first computer as inactive in response to a first signal received via the first computer port. As noted above that first signal may be a deactivation signal from a first computer coupled to the first computer port. Alternatively or subsequently, the first computer port may be set as active and the second computer as inactive in response to a second first signal received via the second computer port. Again, the second signal may be a deactivation signal from a second computer coupled to the second computer port. In another implementation, a selected one of the first and second computer ports is set as active and the other as inactive in response to a peripheral signal received via the peripheral port. Referring to FIG. 2, the foregoing steps may be implemented by controller 26.
  In response to a second mode determination (step 106):
    peripheral signals are routed from the peripheral port via the first computer port (step 108); and
    display signals corresponding to the first video signals are communicated via the first and second monitor ports (step 110).
In response to a third mode determination (step 112):
    peripheral signals are routed from the peripheral port via the second computer port (step 114); and
    display signals corresponding to the second video signals are communicated via the first and second monitor ports (step 116).
Referring again to FIG. 2, controller 26 may be responsible for implementing steps 108, 110, 114, and 116.

Additionally, a memory storing program instructions may be provided. Memory 42 of FIG. 2 is an example. The program instruction are caused to be communicated to a first computer coupled to the first computer port and to a second computer coupled to a second computer port. The program instructions, when installed, enable computers to communicate video signals via the first and second computer ports. The program instructions, when installed, may also enable file sharing between the first computer and the second computer. As such, the method depicted in FIG. 5 may also include routing file sharing data between the first computer and the second computer via the first and second computer ports.

FIG. 6 depicts a method implemented on a computer coupled to an external apparatus according to an embodiment. In the example of FIGS. 1 and 2, that external apparatus is docking station 12. A signal is received via a computer port of the external apparatus (step 118). It is determined if that signal is an activation signal (step 120). Here, an activation signal is a signal indicating that peripheral signals are to be received via the computer port and acted upon and that video signals are to be communicated via the compute port. Referring to FIG. 3, driver 64 when executed by processor 54 is responsible for utilizing external port 55 to implement steps 118 and 120.

Upon a negative determination in step 120, the process skips back to step 118. Upon a positive determination in step 120, input device signals are received via the computer port (step 122). The input signals, for example, can include signals originating from a key board and mouse coupled to the external apparatus. Video signals are communicated via the computer port to the external apparatus (Step 124). The video signals are for use by the external apparatus to drive a display on a selected one or both of a first monitor and a second monitor coupled to the external device. The display being driven is reflective, at least in part, of the input device signals received in step 118.

The input device signals received in step 122 are monitored for an indication that the computer port is to be deactivated and another computer port of the external apparatus is to be activated (step 126). As discussed, such may be indicated by a predetermined sequence of keystrokes from a keyboard, or signals from a mouse indicating movement of a mouse cursor to or passed a given coordinate of set of coordinates. Upon a negative determination in step 126, the process skips back to step 122. Upon a positive determination, A deactivation signal is communicated via the computer port to the external apparatus (step 128). Video signals are communicated via the computer port to the external apparatus (Step 130). Again, the video signals are for use by the external apparatus to drive a display on a selected one or both of a first monitor and a second monitor coupled to the external device. However, that display being driven is no longer reflective of the input device signals received in step 118. The process then repeats with step 118 to await a subsequent activation signal.

Figure 7A:
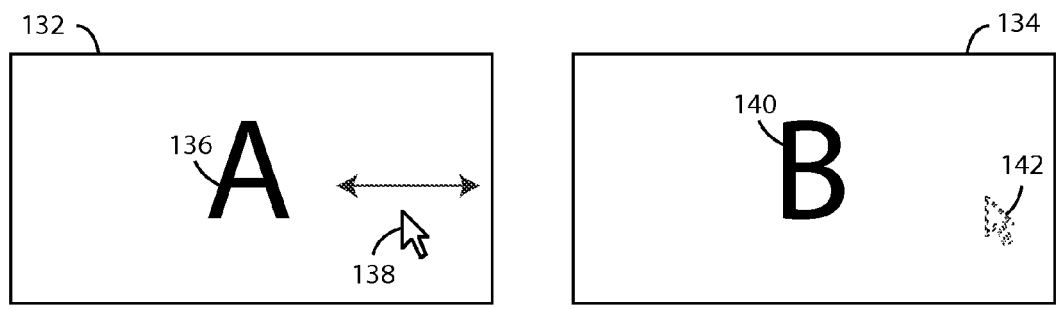
FIGS. 7A-7C depict exemplary screen displays resulting from various operational modes.

EXAMPLES: The diagrams of FIGS. 7A-7C and 8A-8D are used to depict exemplary screen displays a docking station according to embodiments. In discussing the examples, reference is made to docking station 12 of FIG. 2. As described, docking station 12 of FIG. 2 is configured to operating in various modes. FIG. 7A depict three such modes. FIG. 7A corresponds to a first mode in which docking station 12 drives display 132 according to video signals received via first computer port 28 and display 134 according to video signals received via second computer port 30. Display 132, in this example is active and includes content 136 and mouse cursor 138. Content 136, shown as the letter "A", represents the information displayed as part of a graphical user interface generated according to video signals received via first computer port 28. Content 136 can include any combination of text and images. Because display 132 is active, mouse cursor 138 is shown moving in response to input device signals routed between peripheral port(s) 36 and first computer port 28.

Display 134 is not active and includes content 140 and mouse cursor 142. Content 140 shown as the letter "B", represents the information displayed as part of a graphical user interface generated according to video signals received via second computer port 30. Content 140 can include any combination of text and images. Because display 134 is not active, mouse cursor 142 is shown broken lines as unresponsive to any input device signals received via peripheral port(s) 36.

Figure 7B:
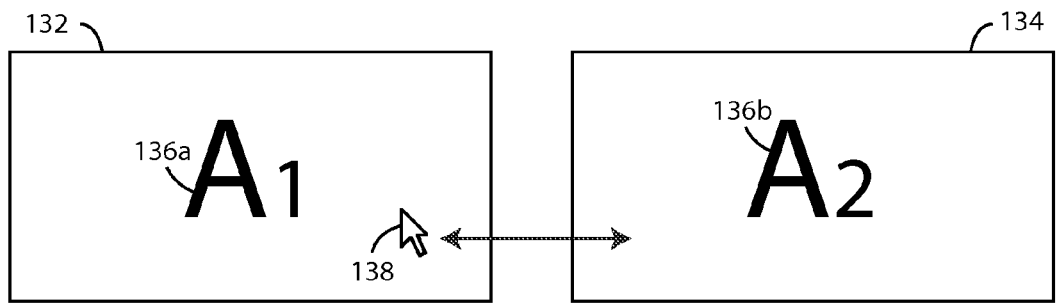

FIG. 7B corresponds to a second mode in which docking station 12 drives displays 132 and 134 according to video signals received via first computer port 28. Display 132, in this example includes content 136a and mouse cursor 138. Display 134 includes content 136b. Content 136a and 136b, depicted as "A1" and "A2", represent the information displayed as part of a graphical user interface generated according to video signals received via first computer port 28. Here that user interface is extended across both displays 132 and 134. Mouse cursor 138, moving in response to input device signals routed between peripheral port(s) 36 and first computer port 28, can travel back and forth between displays 132 and 134.

Figure 7C:
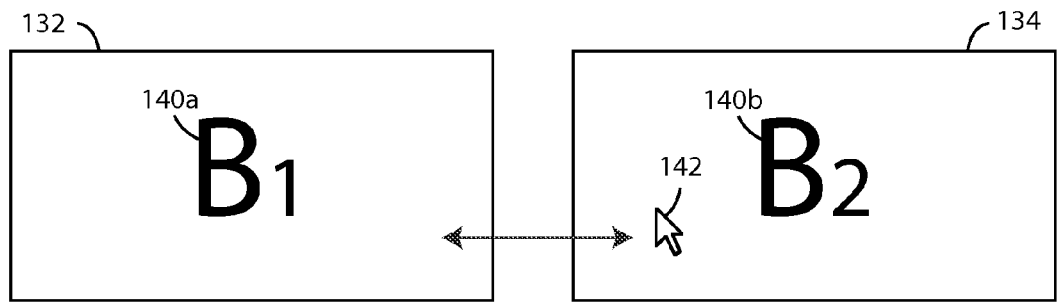

FIG. 7C corresponds to a third mode in which docking station 12 drives displays 132 and 134 according to video signals received via second computer port 30. Display 132, in this example includes content 140a. Display 134 includes content 140b and mouse cursor 142. Content 140a and 140b, depicted as "B1" and "B2", represent the information displayed as part of a graphical user interface generated according to video signals received via second computer port 30. Here that user interface is extended across both displays 132 and 134. Mouse cursor 142, moving in response to input device signals routed between peripheral port(s) 36 and second computer port 30, can travel back and forth between displays 132 and 134.

Figure 8A:
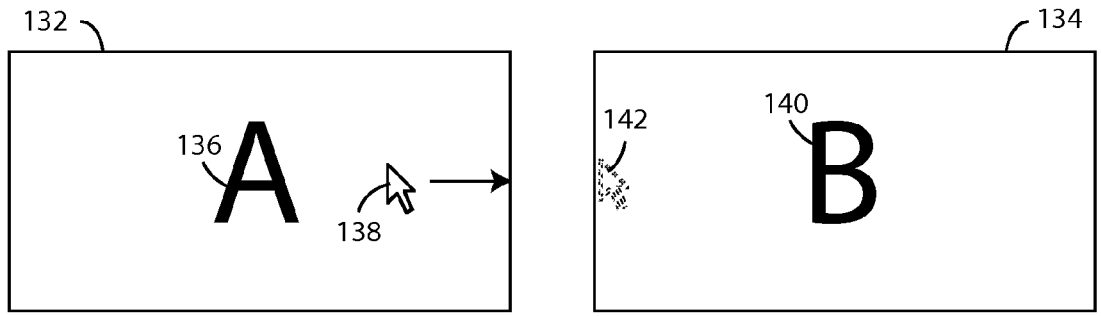
FIGS. 8A-8D depict exemplary screen views in which computer port activation is switched based on cursor movement.
Figure 8B:
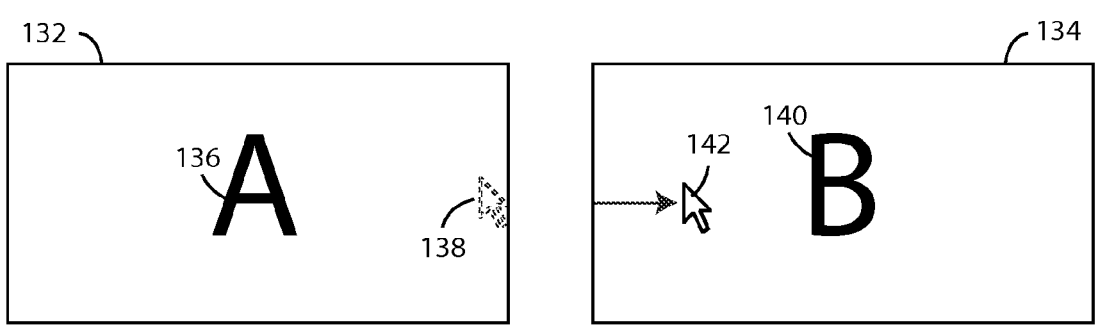

FIGS. 8A-8D illustrate an example of the first mode of FIG. 7A in with displays 132 and 134 are activated and deactivated according to movements of mouse cursors 138 and 142. Starting with FIG. 8A, display 132 is shown as active with mouse cursor moving to the right edge of display 132. Motion of mouse cursor 138 results from input device signals routed from peripheral port(s) 36 via first computer port 28. Upon detection of mouse cursor 138 reaching that right edge, a deactivation signal is communicated to docking station 12 via first computer port 28. In response, docking station 12 deactivates first computer port 28 and activates second computer port 30. Display 134, as depicted in FIG. 8B, is now active with mouse cursor 142 moving in response to input device signals routed from peripheral port(s) 36 via second computer port 30.

Figure 8C:
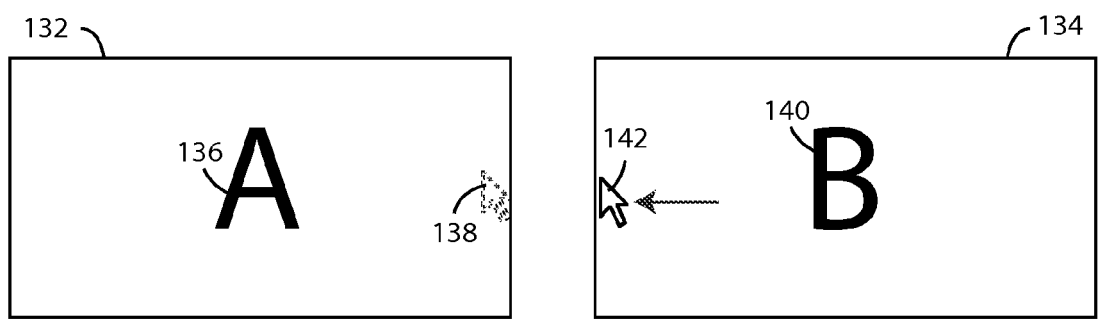
Figure 8D:
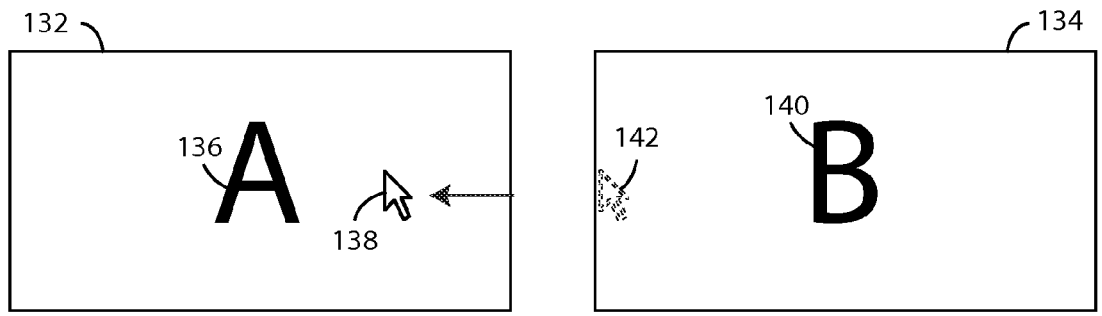

In FIG. 8C with display 134 still active, mouse cursor 142 moves to the left edge of display 134 in response to input device signals routed from peripheral port(s) 36 via second computer port 30. Upon detection of mouse cursor 138 reaching that left edge, a deactivation signal is communicated to docking station 12 via second computer port 30. In response, docking station 12 deactivates second computer port 30 and activates first computer port 28. Display 132, as depicted in FIG. 8D, is now active with mouse cursor 138 moving in response to input device signals routed from peripheral port(s) 36 via first computer port 28.

CONCLUSION: The diagram of FIG. 1 is used to depict an exemplary environment in which various embodiments may be implemented. Implementation, however, is not so limited. FIGS. 2-3 show the architecture, functionality, and operation of various embodiments. Various components illustrated in FIGS. 2-3 are defined at least in part as programs or program instructions. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Also, the present invention can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagrams of FIG. 4-6 show specific orders of execution, the order of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. An apparatus, comprising a first computer port to receive a first video signal, a second computer port to receive a second video signal, a controller to selectively drive displays of a first monitor and a second monitor according to the first and second video signals, the controller configured to operate in a: first mode in which the display of the first monitor is driven according to the first video signal, and the display of the second monitor is driven according to the second video signal; second mode in which the displays of the first and second monitors are driven according to the first video signal; and third mode in which the displays of the first and second monitors are driven according to the second video signal; and further comprising: a peripheral port to couple with a peripheral device and wherein the controller: when operating in the first mode, is configured to route peripheral signals from the peripheral port via an active one of the first and second computer ports; when operating in the second mode, is configured to route peripheral signals from the peripheral port via the first computer port; and when operating in the third mode is configured to route peripheral signals from the peripheral port via the second computer port.

2. The apparatus of claim 1, wherein the controller, when operating in the first mode, is configured to selectively: set the second computer port as active and the first computer port as inactive in response to a first signal received via the first computer port; and set the first computer port as active and the second computer as inactive in response to a second signal received via the second computer port.

3. The apparatus of claim 1, wherein the controller is operable to set a selected one of the first and second computer ports as active and the other as inactive in response to a peripheral signal received via the peripheral port.

4. A non-transitory computer readable storage medium, having computer executable instructions that when executed by a first computer implement a method, the method comprising receiving, via a first computer port of an external apparatus, an activation signal that indicates the first computer port is active for the first computer, and upon receiving the activation signal:

receiving input device signals via the first computer port; and communicating, via the first computer port, video signals for use by the external apparatus to drive a display on a selected one or both of a first monitor and a second monitor, the display being reflective, at least in part, of input device signals received via the first computer port;

determining if a given input device signal or signals are indicative of a deactivation instruction indicating that the first computer port of the external apparatus is to be deactivated and a second computer port of the external apparatus is to be activated for a second computer; and wherein the input device signals determined to be indicative of a de-activation instruction are input device signals originating from one of a keyboard and pointing device indicating that a predetermined button or sequence of buttons have been pressed.

5. The non-transitory computer readable storage medium of claim 4, comprising upon a positive determination of deactivation:

communicating the deactivation instruction to the external apparatus; and communicating, via the first computer port, video signals for use by the external apparatus to cause a display that is not reflective of input device signals received via the first computer port.

6. The non-transitory computer readable storage medium of claim 5, wherein the input device signals determined to be indicative of a de-activation instruction are input device signals originating from a pointing device that cause a motion of a cursor to or passed a predetermined coordinate or set of coordinates.

7. The non-transitory computer readable storage medium of claim 6, wherein the predetermined coordinate or set of coordinates define a predetermined edge of a display.

8. The non-transitory computer readable storage medium of claim 5, wherein the activation signal is a first activation signal, the input device signals are first input device signals, and the video signals are first video signals, the method including, following communication of the deactivation instruction, awaiting a second activation signal that indicates that the first computer port of the external apparatus is active, and upon receiving the second activation signal:

receiving second input device signals via the first computer port; and communicating, via the first computer port, second video signals for use by the external apparatus to cause a display of a user interface on a selected one or both of a first monitor and a second monitor, the user interface being reflective, at least in part, of the second input device signals received via the computer port.

9. The non-transitory computer readable storage medium of claim 4, wherein the method includes:

receiving file sharing data via a computer interface of the external apparatus; and updating a file sharing repository maintained by the computer utilizing the file sharing data.

* * * * *